United States Patent
Skillman et al.

(10) Patent No.: US 8,136,085 B2
(45) Date of Patent: Mar. 13, 2012

(54) SYSTEM AND METHOD FOR IMPLEMENTING A SHARED PLATFORM OR SOFTWARE RESOURCE FOR COUPLED COMPUTING DEVICES

(75) Inventors: Peter Skillman, San Carlos, CA (US); Kevin Michael O'Shaughnessy, Galway (IE); Sung-ho Park, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 973 days.

(21) Appl. No.: 12/152,656

(22) Filed: May 14, 2008

(65) Prior Publication Data

US 2009/0193155 A1 Jul. 30, 2009

Related U.S. Application Data

(60) Provisional application No. 61/024,541, filed on Jan. 29, 2008.

(51) Int. Cl.
*G06F 3/00* (2006.01)
(52) U.S. Cl. .......... 717/100; 717/169; 717/175; 710/33; 710/31; 710/73; 710/74
(58) Field of Classification Search ............... 717/174; 710/14; 455/556.1, 556.2, 557
See application file for complete search history.

(56) References Cited

U.S. PATENT DOCUMENTS

| | | | | |
|---|---|---|---|---|
| 6,745,047 | B1 * | 6/2004 | Karstens et al. | 455/556.1 |
| 7,242,963 | B1 * | 7/2007 | Karstens et al. | 455/557 |
| 7,606,575 | B2 * | 10/2009 | Mahany et al. | 455/452.2 |
| 2003/0110389 | A1 * | 6/2003 | Elteto | 713/191 |
| 2004/0078503 | A1 * | 4/2004 | Zaudtke et al. | 710/72 |
| 2008/0032738 | A1 * | 2/2008 | Boyer et al. | 455/556.1 |
| 2008/0153499 | A1 * | 6/2008 | Lindfors et al. | 455/445 |

* cited by examiner

*Primary Examiner* — Don Wong
*Assistant Examiner* — Lynda Dinh

(57) ABSTRACT

A computing device includes a communication port, memory resources, and one or more processors. The one or more processors are configured to combine with the memory resources to operate one or more of the plurality of modules. The plurality of modules are operative in order to handle exchange of communications with a primary computer over the communication port. The one or more modules include a first module that is operative in a first communication mode in enabling exchange of communications with the primary computer over the communication port. The exchange of communications causes the primary computer to access and execute one or more autorun files from the computing device. The one or more modules may also include a second module that is operative in a second communication mode to be operative in enabling an alternative function to be performed with or for the primary computer over the communication port.

19 Claims, 5 Drawing Sheets

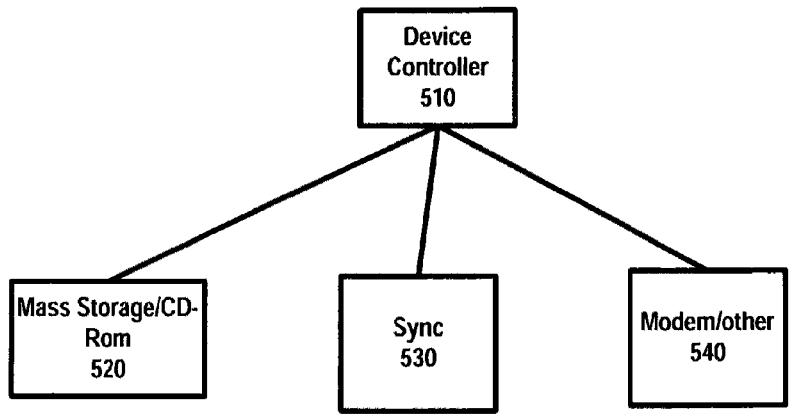

FIG. 5

| Handheld Device 100 | Primary Computer 120 |
|---|---|
| Handshake/Connect<br><br>Present As Mass Storage Device/CD Rom<br><br>610 | Handshake/Connect<br><br>Recognize As Mass Storage Device/CD Rom<br><br>612 |
| Provide Autorun File(s)<br><br>UI/Install<br><br>620 | Run Autorun<br>Launch UI<br>Initiate/Perform Install<br><br>622 |
| Monitor For Driver Dismount Command<br><br>632 | Process UI Input<br>Transmit User-Input to Switch Modes<br><br>630 |
| Dismount Mass Storage Device Driver<br><br>640 | Remove User-Interface<br><br>642 |
| Load Sync or Alternative Driver<br><br>650 | Recognize and Communicate With Sync Driver<br><br>652 |

FIG. 6

SYSTEM AND METHOD FOR IMPLEMENTING A SHARED PLATFORM OR SOFTWARE RESOURCE FOR COUPLED COMPUTING DEVICES

RELATED APPLICATIONS

This application claims benefit of priority to provisional U.S. Patent Application No. 61/024,541, filed Jan. 29, 2008; the aforementioned priority application being hereby incorporated by reference in its entirety.

TECHNICAL FIELD

The disclosed embodiments relate to a system and method for implementing a shared platform or software resource for coupled computing devices.

BACKGROUND

FIG. 10 illustrates typical contents of the mobile device package, as sold through retail outlets. The package may include a mobile device 1010, a cable 1020, and a CD-ROM or other storage media on which installation files and user manuals and other resources may be provided. The user may install the CD-ROM on a desktop or laptop computer (i.e. a "primary computer"). With use of the CD-ROM, the user may select language preference, install software application(s) necessary for communicating with the mobile device, review the user manual, preview or receive access to third-party applications, and receive support information.

BRIEF DESCRIPTION OF THE DRAWINGS

FIG. 5 is a simplified block diagram of logical elements of the mobile device for enabling the alternative communication modes such as described with embodiments of FIG. 3 and FIG. 4.

FIG. 6 is a flow diagram that illustrates sequences of operations performed by a mobile device and a primary computer when the mobile device is connected under the mass storage drive, under an embodiment.

DETAILED DESCRIPTION

Figure 1:
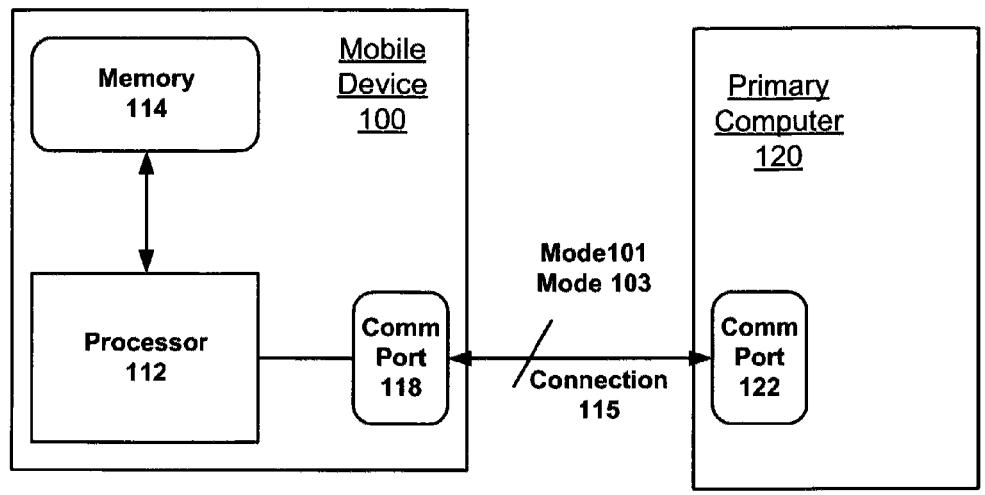
FIG. 1 illustrates a system that enables communications between a mobile device and a primary computer, according to an embodiment.

Embodiments described herein enable implementation of a shared platform or software resource amongst paired or coupled computing devices. In particular, an embodiment provides that a mobile device is equipped, with drivers or other resources, to enable programmatic detection as to whether a programmatic resource is present on the primary computer. In one implementation, the programmatic resource may include software that enables or otherwise facilitates the mobile device and the primary computer in being paired, sharing an integrated platform, or otherwise sharing/synchronizing data.

An embodiment further provides for establishing a communication platform or software resource for the pairing of a mobile computing device and primary computer, where the mobile computing device has the added ability to emulate more than one type of device for purpose of triggering actions on the primary computer to cause or affect installation of the desired programmatic resource. Instructions for the installation may be carried on the mobile device. As an alternative or addition, the mobile device may trigger or assist the primary computer in downloading the instructions from a website. In this way, mobile device may serve as a source for the installation of the platform or software resource on the primary computer as necessary.

Additionally, one or more embodiments described herein enable a mobile device to be equipped with logic and programming to enable the device to simulate storage media from which a primary computer may be configured to operate in a partnership or synchronization capacity with the mobile device. In general, the mobile device may refer to a wireless cellular voice and messaging device. The primary computer may correspond to a desktop or laptop computer.

According to an embodiment, a mobile device is configured to include logic and programming, for use with a primary computer. The logic or programming may eliminate the need for inclusion of a separate installation CD-ROM or media in the packaging of the device as a product. Among other functionality, the logic and programming provided on the mobile device may be executed (either on the mobile device or on the primary computer) to detect whether a connected primary computer has necessary software for creating a communication partnership with the mobile device. Moreover, an embodiment provides that the programming and logic carry software or instructions, to enable the primary computer (either through manual operation or automatically) to be equipped with the necessary software if the determination is made that the software is not present. In one embodiment, the user may transfer the files to the primary computer from the mobile device. Other variations are possible, such as the mobile device prompting or directing the primary computer to access an Internet location (e.g. supply URL that is used by a browser on the primary computer) where the file is available for download. Programming that can be detected and/or transferred from the mobile device may include communication software that enables the primary computer and mobile computing device to synchronize and share data.

Still further, one or more embodiments described herein enable a mobile device to establish a partnership for communication activity with a primary computer, without need of a separate media to carry software needed to establish the partnership and communication activity. Rather, embodiments described herein enable the mobile device to simulate a CD-ROM or other media that would otherwise carry programs (such as executable files) for the primary computer. The mobile device may be configured to (i) provide or execute processes that detect the presence of the necessary software on the primary computer, (ii) enable or cause installation of the necessary software when the necessary software is not detected as being present, and (iii) implement different communication modes and functionality when communicating with the primary computer, depending on whether the primary computer is determined to have the necessary software. Under one embodiment, the mobile device is able to be seen as a CD-ROM or independent media for enabling installation on or use of the necessary software to the primary computer, but only if the mobile device determines that the necessary software is not present on the primary computer. Depending on the implementation, the installation files may be transferred from the mobile device, or the mobile device may direct the primary computer to access the files from a website or other network location. When the necessary software is in fact present on the primary computer, the mobile device may suppress its CD-ROM/mass storage functionality and simply communicate with that software.

Still further, one or more embodiments include a computing device comprising a communication port, memory resources, and one or more processors. The one or more processors are configured to combine with the memory resources to operate one or more of the plurality of modules. The plurality of modules are operative in order to handle exchange of communications with a primary computer over the communication port. The one or more modules include a first module that is operative in a first communication mode in enabling exchange of communications with the primary computer over the communication port. The exchange of communications causes the primary computer to access and execute one or more autorun files from the computing device. The one or more modules may also include a second module that is operative in a second communication mode to be operative in enabling an alternative function to be performed with or for the primary computer over the communication port.

Additionally, one or more embodiments provide for establishing one of a first communication mode or a second mode to communicate with a primary computer that is coupled to the computing device across a communication port. When the first communication mode is established, the primary computer may be triggered to access and autorun one or more files that are stored on the mobile device. The one or more files include an installation file for a program that when operated on the primary computer, enables the computing device to establish the second communication mode to communicate with the primary computer. In response to detecting that the primary computer has the program installed, the computing device switches from the first communication mode to the second communication mode.

Among other benefits, embodiments described herein enable elimination of independent media in the packaging of mobile devices. For example, mobile devices are typically sold with CD-ROM software installation programs and user manuals. Such media adds bulk to the overall package. Moreover, users are compelled to install the CD-ROM, even when their computers are equipped with the necessary software, thereby diminishing the out-of-the-box experience of the user. In contrast to conventional approaches, embodiments described herein enable the user to simply connect the mobile device to the primary computer, without the first-time requirement of CD-ROM operation or installation. In this way, the packaging and out-of-the-box experience of the user is enhanced. Moreover, the user no longer needs to manually install software on separate computers using CD-Roms or the like, but rather can rely on the mobile device functionality.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistants or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Description

FIG. 1 illustrates a system for enabling communications between a mobile device 100 and a primary computer 120, according to an embodiment. The mobile device 100 includes one or more processor(s) 112, a memory resource 114, and a communication port 118 that enables a connection to be made with a corresponding communication port 122 of the primary computer 120. The communication port 118 may correspond to either a wireless or wireline port, such as provided with any of the different connectors and connections (e.g. USB, micro-USB, wireless USB) defined under any one of the Universal Serial Bus standards. While local wireless or wireline connections are contemplated, an embodiment may provide for the mobile device 100 to establish, for purpose of implementing any of the embodiments described herein, a link with the primary computer that may be made wirelessly and/or made across a network, such as through a cellular network, through infrared communications, or through WiFi (or other radio-based communications).

In one variation, the communication port 118 includes a port that is capable of one or both of standardized and/or proprietary protocols. For example, the port 118 may modify or provide one or more additional pins in its layout, as compared to an otherwise standardized port 118.

Still further, the mobile device 100 may correspond to a wireless communication device, such as a cellular telephony/messaging device. The primary computer 120 may correspond to a fully resourced computer system, such as a desktop computer or laptop computer that includes a heavy operating system.

In an embodiment, functionality described with a system such as shown by FIG. 1 is implemented when the mobile device 100 or primary computer 120 do not "know" each other. This may occur when, for example, the mobile device 100 is first connected to the primary computer 120, or just after when the mobile device is reset. In such a scenario, an embodiment provides that the processor 112 of the mobile device 100 is configured to implement different communication modes 101, 103 in the connection 115 formed between the mobile device 100 and the primary computer 120. Each communication mode may incorporate or use a different communication protocol.

Still further, the mobile device 100 may execute a process, or provide a programmatic process that executes on the primary computer 120, that automatically detects whether a specific programming resource is provided on the primary computer 120. The specific programmatic resource may correspond to an application or programmatic element that is part of a communication platform for enabling data sharing or synchronization between the mobile computing device 100 and the primary computer 120. In one embodiment, the specific programming resource that is sought corresponds to a synchronization application for updating or synchronizing emails, contact records, calendar events (or other personal information management records) of the primary computer 120 and the mobile device 100. In one embodiment, the processor 112 selects the communication mode 101, 103 based on a determination as to whether the primary computer 120 has the specific programming resource. In another embodiment, the communication modes are set, at least initially, by default designations. For example, in one implementation, the default designation is based on the assumption that the programmatic resource does not exist. From the default setting, the communication modes may be switched based on user input, or the occurrence of certain conditions (e.g. after initial use, responsive to user-input, passage of time).

In an embodiment, each communication mode 101, 103 has a corresponding protocol or associated function or purpose that is different than that of the other communication mode. Under one embodiment, the communication mode 101 is implemented responsive to the programmatic determination that the primary computer 120 has the programming resource corresponding to a synchronization and/or communication application. The first communication mode 101 may include a protocol by which data is exchanged or synchronized between the two computers. Likewise, the second communication mode 103 is implemented responsive to a programmatic determination that the programmatic resource is not present on the primary computer 120. The second communication mode 103 may enable a primary or alternative functionality, such as functionality to enable or facilitate transfer/synchronization of application and/or data files to and from the primary computer. As another embodiment, the second communication mode 103 may be default when the device is new or subjected to a hard reset (see e.g. FIG. 3A and FIG. 3B). As described below, a switch amongst communication modes may be made programmatically (i.e. responsive to events or conditions) or manually (including through manipulation of hardware or software input features).

Methodology

Embodiments described herein contemplate multiple techniques or methods by which a system such as described with FIG. 1 may be implemented to enable and provide a shared platform amongst a paired or coupled computing device combination. One or more embodiments provide that a mobile computing device is configured to emulate multiple kinds of devices to a paired primary computer for purpose of enabling (i) installation of a communication platform/application on the primary computer (as needed), (ii) use of the communication platform/application with the primary computer, and/or (iii) use of some other programmatic resource or application with the primary computer.

Figure 2:
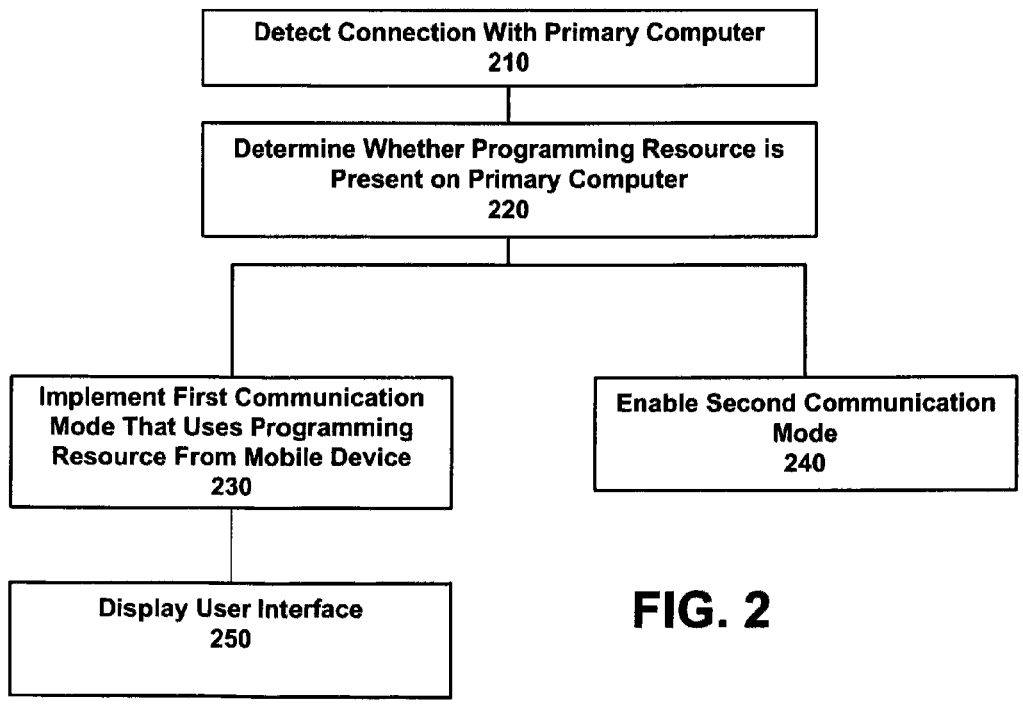
FIG. 2 illustrates a programmatic method that may be implemented on the mobile device, according to an embodiment.

With reference to FIG. 2, an embodiment provides a computer-implemented method in which a mobile computing device is configured to be able to switch into a mode by which an installation source is emulated. A computer-implemented method such as described may be performed through execution of code or software on the mobile device 100 and/or primary computer 120. According to an embodiment, method such as described may enable the mobile device to emulate or otherwise operate as a 'mass storage device' for use in installing resources or other software onto a primary computer, according to an embodiment. The device may emulate such an installation source by detecting first-time installation or pairing. In describing a method of FIG. 2, reference is made to elements of FIG. 1 for purpose of illustrating suitable elements for performing a step or sub-step being described.

In a step 210, processor 112 of the mobile device 100 detects the connection with the primary computer 120. In one embodiment, the mobile device 120 monitors a communication port to detect presence of another device. In one embodiment, the communication port 118 may be operated as a USB port. With standard USB protocol, the processor 112 may detect the presence of a computer such as the primary computer 120.

In step 220, the processor 112 executes, or causes execution of, a process that makes a determination as to whether a specific programming resource is present on the connected primary computer 120. As described with an embodiment of FIG. 1, the specific programming resource may correspond to a communication and/or synchronization application that controls, enables or otherwise facilitates communications between the mobile device 100 and primary computer 120. In an embodiment, processor 112 may execute logic or programming when a first-time (or configuration-time) connection is made with a primary computer. The logic programming may seek to identify the primary computer 120, and/or wait for the primary computer to initiate a form of communication. In particular, one embodiment may initiate with the false presumption that the (i) communication application is installed on the primary computer 120, and (ii) be configured to detect a return communication in which the communication application (which is presumed to be present) seeks out a corresponding component on the mobile device. If a duration passes where the communication application is not detected as accessing the corresponding component on the mobile device, the determination may be made that the communication application is not present on the primary computer 120. As an alternative or variation, the processor 112 may execute or cause execution of a process that seeks to identify specific or non-specific software components or applications are associated with the communication port in use on the primary computer 120. In one implementation, an application on the mobile device may seek to receive or exchange preliminary data with a corresponding component on the primary computer 120. The initial data exchange (or attempt thereof) may determine as to whether: (i) the sought out communication program or programming is present on the primary computer; (ii) the sought out communication program or programming is not present or is incompatible; or (iii) the sought out communication program is present as a prior or incompatible version to the corresponding programming element on the mobile device.

If the application or other programming resource is detected in step 220, step 230 provides that the mobile device 100 implements a first communication mode that involves use of the detected resource on the primary computer 120 and/or its corresponding programming element on the mobile device. The first communication mode may, for example, (i) implement and use a specific data transfer protocol with the primary computer, and (ii) use, or be controlled by the detected communication application. The first communication mode may be implemented automatically, or in response to a user input. In one implementation, the use of the detected resource may correspond to steps performed in establishing a pairing or relationship between the mobile device and the primary computer 120. An example of the first communication mode is a connection made through Remote Network Driver Interface Specification (RNDIS), as provided through ACTIVESYNC software (published by MICROSOFT CORP.).

If the determination of step 220 is that the programming resource is not detected, step 240 provides that the mobile device 100 programmatically or automatically enables another communication mode for communications between the two other devices. In one embodiment, the processor 112 identifies itself as a mass storage device (using, for example, USB Protocol), and presents one or more files to the user for selection and transfer to the primary computer 120. This may include files for providing the primary computer with the communication or synchronization application.

As an alternative or addition, step 240 may provide for the automatic transfer of files to enable the communication application (or other programming resource) on the primary computer. Thus, once no programming resource is detected, step 240 may enable the automatic transfer as part of the second communication mode, with or without the mobile device implementing other functionality such as declaring itself as mass storage.

Still further, as another option, an embodiment provides that the mobile device 100 enables the user to control further the selection and use of the particular communication mode, after the processor of the device implements the first mode. In one embodiment, subsequent to step 230 (where the communication mode uses the detected resource on the primary computer 100), the mobile device provides instructions or otherwise prompts the primary computer 120 into enabling the user to select to switch functionality and/or communication modes. For example, if in the first communication mode, the mobile device 100 and the primary computer 120 are exchanging communications as part of a partnership, step 250 provides that the user is shown (either on the primary computer or on the mobile device) a user-interface that enables the user to switch communication modes and functionality provided by the mobile device. Under one embodiment, the user may select (i) to switch to the second communication mode, where the mobile device is seen by the primary computer as a mass storage device (e.g. dismount first communication mode/connection and mount new communication mode/connection); or (ii) to switch to a third communication mode, such as one where the mobile device 100 is used by the primary computer 120 as a modem for Internet browsing.

As an alternative or additional embodiment to a methodology such as described with FIG. 2, one or more embodiments provide that the mobile device 100 is configured to integrate and leverage the operating system of the personal computer in order to provide its own functionality. In particular, one or more embodiments provide that the mobile device 100 is configured to emulate a CD-Rom drive to the primary computer 120 in order to trigger the operating system of the primary computer 120 to perform a specific set of anticipated functions. Such emulation enables the mobile device 100 to perform desired tasks and functions under established frameworks and protocols, so that the mobile device 100 is capable of equipping or enabling the equipment of the primary computer 120 with programmatic resources for use with communications with the mobile computing device. Accordingly, the mobile device 100 is able to cause execution (on the primary computer) of an application or set of instructions that enable one or more of the following: (i) initiate and/or complete program installation; (ii) launch user-interface; and (iii) switch modes of operation with the primary computer when triggered.

Figure 3B:
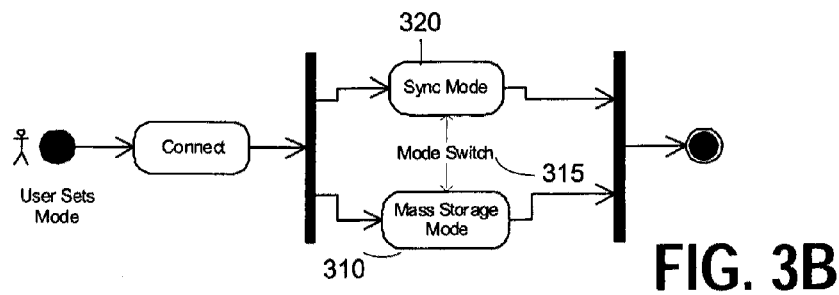
FIG. 3A and FIG. 3B illustrate mode settings of the device under different conditions, according to an embodiment.
Figure 3A:
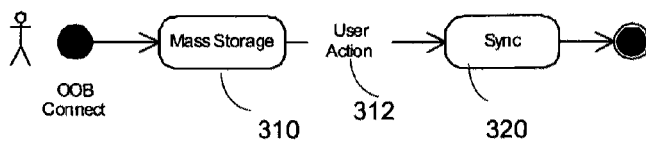

With reference to FIG. 3A and FIG. 3B, the mode settings of the device are illustrated under different conditions. In an embodiment, the mobile device 100 is capable of at least two mode settings: (i) mass-storage mode 310-, and (ii) synchronization or communications mode 320. As will be described, the mass-storage mode 310 may be of a 'CD-Rom' variant, which under existing conventions, triggers the operating system of the mated primary computer 120 to run a program or set of instructions supplied from the device. Thus, as an alternative to a mass-storage/CD-Rom mode, another embodiment provides that the mobile device 100 emulates a device that triggers the primary computer 120 to perform an 'autorun' of a programmatic resource stored on or from the mobile device 100. In such an embodiment, the primary computer 120 may be pre-configured to use drivers or operating level resources to load and execute one or more applications and interfaces from an attached device.

When two modes of communication are provided, an embodiment may require the mobile device 100 to have default mode settings. In particular, the mobile device 100 may have default mode settings for an 'out-of-the-box' ("OOB") configuration state (e.g. such as when the device is used for the first time after purchase) or after hard reset state. In FIG. 3A, the device is shown having the OOB configuration state in which the mass storage mode 310 is default. In one embodiment, the OOB configuration state sets the device to the mass-storage device mode set as default. In this mode, the mobile device 100 mounts the mass-storage device driver to the communication port of the mobile device 100 until an event or condition causes that driver to be dismounted in favor of the alternative synchronization or communication driver. Such an event of condition may correspond to, for example, user action 312 or the passage of time or the first instance that the mobile device 100 is coupled to the primary computer 120.

According to an embodiment, the OOB condition may also be representative of a condition of the device just after a hard reset. In the OOB condition, the device may have a setting that establishes as default that the mode setting is to emulate the CD-Rom drive.

FIG. 3B illustrates the scenario where the mobile device 100 is no longer in the out-of-box state. In such scenario, the default setting may switch, in that the communication mode 320 may be enabled. The device may still be configured to do a mode switch 315, where it switches back to the mass storage mode 310 in response to, for example, user action or programmatic detection of a need for the alternative mode (e.g. device detects a new computer pairing). In one embodiment, mode-switching may be implemented by the user operating a user-interface feature (see FIG. 7), presented on the primary computer 120 but originating from the mobile device 100 when the two devices are connected.

With reference to an embodiment of FIG. 3A and FIG. 3B, when the mobile device 100 is operated in the mass storage device mode, the mobile device may execute, or cause the primary computer 120 to execute, a process that (i) checks existing installation resources on the primary computer; (ii) provides installation resources for the primary computer as needed. As will be described, the primary computer 120 may be checked for existence of any application or resource that constitutes, for example, the communication platform with the mobile device 100, including determination of whether older or alternative versions of the communication platform exist.

Figure 4:
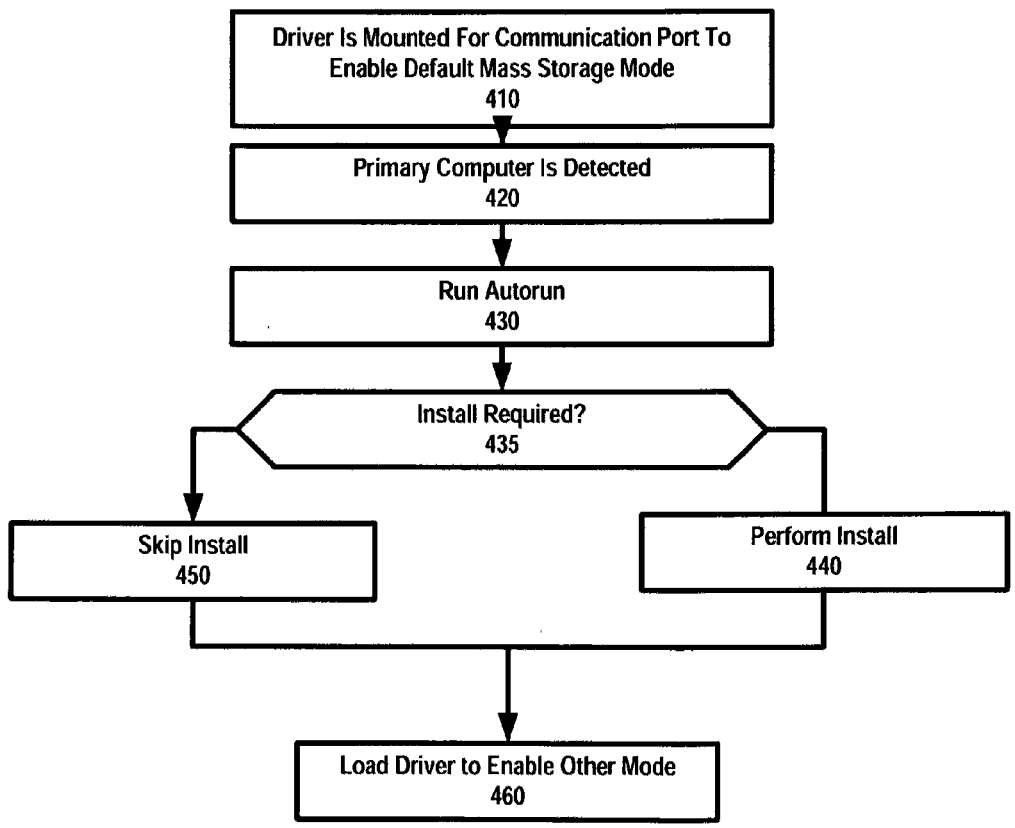
FIG. 4 illustrates another method performed on the mobile device when the mobile device is first connected to the primary computer, under an embodiment.

FIG. 4 illustrates another method performed on the mobile device when the mobile device is first connected to the primary computer, under an embodiment. In an embodiment such as described, the mobile device is capable of emulating devices that enable the communication modes such as described with embodiments of FIG. 3A and FIG. 3B. This allows for the mobile device to provide, control or otherwise serve as a source for installation of software onto the primary computer. As with other embodiments, reference may be made to elements described with other figures in order to specify or illustrate a suitable element for performing a step or sub-step of a method being described.

Step 410 provides that the device is configured to communicate with the primary computer 120 in the mass-storage mode. This mode may be implemented when the mass storage driver is mounted to the communication port 118. The mass storage driver may be of a species or kind that triggers or otherwise causes the primary computer 120 to autorun a corresponding application on the mobile device 100. In one implementation, the mass storage driver corresponds to a CD-Rom driver, which under conventional operating systems (e.g. WINDOWS based systems), are recognizeable to trigger the autorun event. However, other implementations may use other autorun drivers such as those that may be standardized or pre-configured for recognition in the operating system of the primary computer. In one embodiment, step 410 may be implemented by default for when the device is first 'turned-on' or used. Subsequent to the out-of-the box scenario, step 410 may be performed when the user selects the mass storage driver to be active on the communication port 118.

Once the user initially connects the mobile device 100 to the primary computer 120, step 420 provides that the primary computer 120 is detected on the communication port 118. For example, the user may extend a USB (or Firewire) bus line by connecting corresponding USB connectors to the mobile device 100 and the primary computer 120.

In step 430, the primary computer 120 detects the mobile device 100 as a CD-Rom (or other autorun type device) and responds by automatically autorunning the corresponding application that is provided from the mobile device 100. The operating system of the primary computer 120 may include inherent functionality to recognize the CD-Rom driver and autorun the corresponding application residing on the mobile device 100.

In one embodiment, the primary computer automatically initiates the autorun installation process at every instance that the primary computer 120 is connected to the mobile device 100 when the mobile device emulates the mass storage device (i.e. when the mass storage driver is mounted onto the communication port 118). Functionality for detecting the version and/or presence of the application being installed may be integrated into the application installation process. For example, the application that is to be autorun may include or be incorporated with functionality that detects on the installing device whether the program that is being installed is already present. Under one embodiment, the autorun application may correspond to an installation program for a synchronization or data sharing application. Once the installation process is initiated, code or instructions provided with the autorun application may implement a operation that identifies whether the application exists on the primary computer 120. In one implementation, the version of the existing application may also be determined.

The installation process may then determine whether installation is required in step 435. The installation process may determine whether to perform a partial or full installation upon detecting that the desired program is not present (or present under outdated version). If the determination is that a partial or full installation is required, step 440 provides that the required installation is performed. For example, primary computer 120 may execute the autorun application to install an updated or full version of the desired communication or synchronization program.

If the determination of step 435 is that the desired program is present, step 450 provides that the autorun installation program is terminated after it is initiated (or otherwise before its completion). Thus, following step 435, Following one or both of step 440 or 450, step 460 provides that the mobile device 100 may remain in the mass-storage mode until an event or condition occurs that causes the device to switch to another communication mode. In one embodiment, the mobile device 100 may provide instructions with the autorun application that launches a user-interface on the primary computer 120. The user interface enables user input to enable the mobile device to switch communication modes with the primary computer (i.e. mount a different driver to the communication port 118). As an alternative, the mobile device 100 may switch out of the mass storage mode and into one or more alternative modes (such as the synchronization or communication) modes automatically following termination of the mass storage mode.

FIG. 5 is a simplified block diagram of logical elements of the mobile device for enabling the alternative communication modes such as described with embodiments of FIG. 3 and FIG. 4. According to an embodiment, the device 100 includes a controller 510 that implements the communication mode that the device performs across its communication port 118. The controller 510 may implement at least two modes of communication. For example, as described with an embodiment of FIG. 4, controller 510 may implement (i) a mass storage mode in which the controller 510 loads the mass storage driver 520 so as to emulate a mass storage device (i.e. CD-Rom) to the connected primary computer 120, and (ii) a synchronization mode, in which the controller 510 uses another driver 530 in communicating with one or more other applications on the mobile device to exchange and synchronize records with one or more corresponding records on the mobile device.

As an option or alternative, an embodiment provides that the controller 510 may implement three of more communication modes across the communication port 118. In one embodiment, for example, the controller 510 may implement a modem mode, by loading or using another driver 530 in which wireless communication capabilities of the mobile device 100 are extended to the primary computer 120. One or more additional modes 540 of communication may also be implemented.

According to one embodiment, the controller 510 switches modes based on the occurrence of a condition or event. For example, the controller 510 may be configured to implement the mass-storage mode 520 when the device is in an out-of-the-box state. With an event such as provided by user-input, or by completion of a method such as described with FIG. 4, the device may switch modes into another of the modes. For example, as described with an embodiment of FIG. 7, the mobile device 100 may be configured to launch or enable execution of a user interface from which the user can specify instructs or commands that switch the communication mode that is present.

FIG. 6 is a flow diagram that illustrates sequences of operations performed by a mobile device 100 and the primary computer 120 when the mobile device is connected under the mass storage drive mode and then switched to the synchronization mode, under an embodiment of the invention. Reference may be made to elements described in other figures in order to illustrate suitable components or elements for performing an operation being described. An embodiment of FIG. 6 suggests a sequence of steps that may be followed by the mobile device 100 (see FIG. 1) and the primary computer 120 (see FIG. 1). However, other embodiments may vary or alter the sequence, use other steps described elsewhere in this application, or omit one or more steps being described.

Initially, an embodiment described with FIG. 6 assumes that the mobile device 100 has the mass storage driver mounted for use with its communication port 118. Thus, the mobile device 100 may be coupled to the primary computer 120 after, for example, being unpackaged (i.e. brought out of its retail box), operated from a default state, or switched into the mass storage mode. In this scenario, step 610 (as performed on the mobile device 100) and step 612 (as performed on the primary computer 120) provide that the two computers handshake and establish a communication link under an established communication protocol (e.g. USB). The mobile device 100 emulates the CD-Rom mass storage when the communication link is established.

On the mobile device 100: Following establishment of the communication link, step 620 provides that the mobile device 100 enables the primary computer to access and use one or more autorun files that are provided on the mobile device 100. By emulating a CD-Rom device, the primary computer 120 may be triggered to automatically access and launch or use the autorun files. In one embodiment, the mobile device 100 may include one kind of autorun files for initiating installation of the synchronization application or platform, and another kind of autorun in which a user-interface is generated from instruction provided on the 'CD-Rom'.

On the primary computer 120: In step 622, the primary computer executes or launches the autorun programs and files. This includes initiating installation of the synchronization program and launching a user-interface. As described with, for example, an embodiment of FIG. 4, an embodiment provides that the installation of the synchronization program may be terminated prematurely in response to the installation process making a determination that the program already exists on the primary computer 120. Alternatively, the installation process may be completed in response to the installation process making the determination that the program did not exist, or existed as an outdated version.

On the primary computer: In step 630, the primary computer 120 may receive and process input from user-interaction with the displayed user-interface. The input may correspond to a command from the user to switch modes. The primary computer 120 may transmit the command to the mobile device 100. The command may be provided in-part using the established protocol on the communication port.

On the mobile device 100: In Step 632, the controller 510 (see FIG. 5) listens or monitors the communication port 118 on the mobile device 100 for commands that are instructs from the user to switch communication modes.

With regard to steps 630 and 632, the commands that are communicated from the primary computer 120 may include out-of-mode commands. The out-of mode commands may include the instruct that is generated in response to the user specifying input to change modes. In particular, one or more embodiments provide for modifying or embedding a command protocol within existing standardized communication protocols that are used to signal communications across a data bus of two USB ports. An example of such is SCSI signals, which may be used as a means of communication between an application running on the primary computer and the device USB client driver directly by means of an embedded or unsupported command. In order to be received and interpreted as an out-of-mode command, one or more embodiments provide that the primary computer's execution of the autorun files for the user-interface cause the primary computer to generate command instructions that have the overall structure of in-mode commands (i.e. they have headers and data structures that are established by the communication protocol (e.g. SCSI)). The primary computer 120 may inherently include the capability to communicate the command in the standardized format, using, for example, standardized drivers that are normally provided with the computer's operating system. However, the commands carry out-of-bound values that trigger the controller 510, rather than the mass-storage driver. For example, the mass storage driver may pause or not process the out-of-bound command value, thus triggering the controller 510 to respond to the command.

On the mobile device 100: Step 640 provides that response to the command with the out-of-bound value may be that the controller 510 switches communication modes. First, in step 640, the mobile device dismounts the mass storage driver 520.

Step 642 provides that the primary computer 120 may respond by ceasing to recognize the mobile device 100 as a CD-Rom drive, and ceasing to run or use the autorun files. One result may be that the primary computer 120 drops the display of the user-interface.

On the mobile device: One embodiment provides in step 650 that the mobile device's response to the dismount or switch command includes mounting a new driver or communication mode. In the case where the controller 510 operates two drivers (or otherwise provides two communication modes), the switch may be to the only other communication mode present. In an embodiment in which three of more communication modes are present, other criteria or conditions may rule as to whether which of the two or more other communication modes will be selected. In one embodiment, the controller 510 (FIG. 5) identifies which driver to use by interpreting the command from the primary computer 120. For example, the controller may be configured to distinguish between different out-of-bound values that are contained in a command (which may be structured under SCSI protocol). In another embodiment, the controller 510 (FIG. 5) selects the communication mode by a sequence.

The use of out-of-bound values in the commands may enable an embodiment to extend SCSI protocol to allow communication with the mobile device when the mobile device is emulating a CD-Rom device. Under a conventional use, SCSI protocol would only enable simple commands to be exchanged between an application on the primary computer and a connected disk drive, In an embodiment such as described, however, the mobile device may benefit from interpreting a return command from the primary computer as an instruction to perform some operation, such as a mode switch. To make or facilitate interpretation of command on the mobile device, the out-of-bound values may be used in an SCSI structured command to trigger or cause the mobile device (e.g. through its controller) aware of, for example, the user input or some other event that occurs on the primary computer. Thus, the out-of-bound SCSI type commands may enable the primary computer to communicate with the mobile device as a standard CD-Rom device, while enabling the mobile device to interpret the commands from the primary computer in ways that extend outside of the mass storage mode (e.g. mode switch)/

On the primary computer 120: As a result of the autorun installation process or its existing resources, the primary computer 120 is equipped with the necessary program to execute the program or platform needed for use with the mobile device's other communication modes. Step 652 provides that the primary computer 120 handshakes and establishes a connection with the mobile device 100 that uses the platform or shared resource of the alternative communication mode.

Steps 660 and 662 provide that each of the mobile device 100 and the primary computer 120 perform steps of the newly established communication mode. For the synchronization mode, this may correspond to the two computers synchronizing or sharing files. For the modem mode, this may correspond to the mobile device 100 acting establishing a wireless link over a cellular or other wireless network. The operations required for the newly switched mode may be performed automatically once the user provides the command to switch modes using the user-interface.

User Interface

Figure 7:
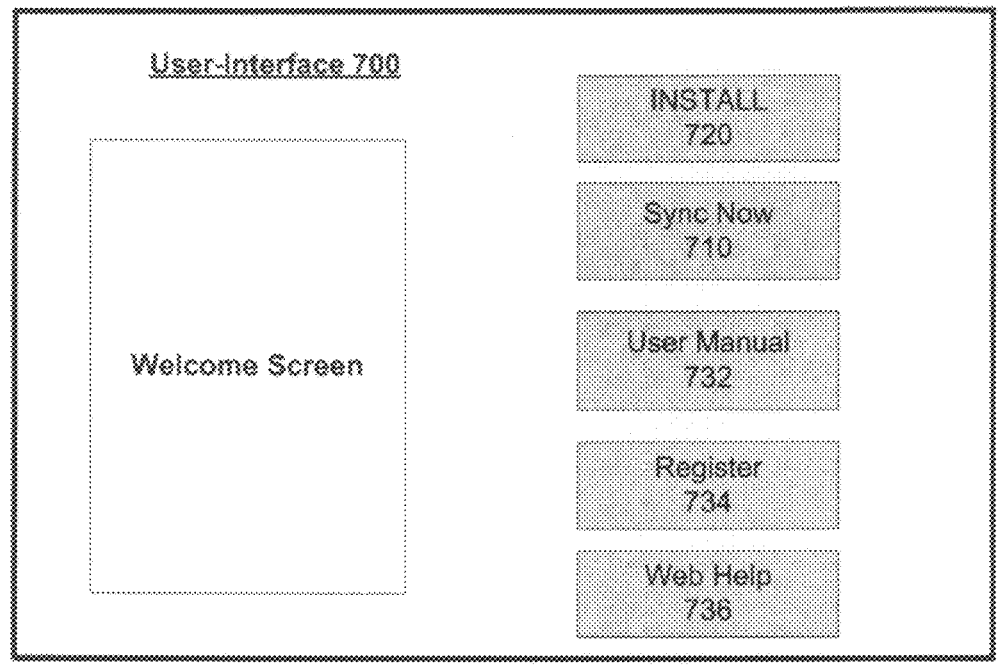
FIG. 7 illustrates a user-interface 700 for use with one or more embodiments described.

FIG. 7 illustrates a user-interface 700 for use with one or more embodiments described. In one embodiment, the user-interface 700 may be generated on the primary computer 120 using files that are read from the mobile device 100 when the mobile device is in the mass-storage mode. As such, the user-interface 700 may result from the primary computer 120 being triggered with the autorun program. The user interface 700 may include one or more features that enable user interaction. The features include, for example, icon selections, check boxes, menu items or other features that enable the user to make selections and enter other input.

According to an embodiment, the user-interface 700 includes a first feature 710 to enable the user to switch communication modes. As detailed with an embodiment of FIG. 6, the user-input may be translated into a command that is communicated back to the primary computer 120.

An embodiment may perform the install at the initiation of the user. Accordingly, a second feature 720 may be provided to enable the user to select as input the option to have the install performed. For example, after a determination that a synchronization program or platform is not present, a menu option may be presented to the user to enable the user to have the program.

The user interface 700 may include numerous other features, including features for enabling access to web resources or assistance. Web resource features may trigger the primary computer 120 to access a corresponding web site to enable the user to view materials or download. As an alternative, the web resource features may enable automatic downloads. For example, a user manual feature 732 may enable the user to operate the user interface 700 to access the user manual, either off the mobile device 100 or from a web site. Likewise, registration 734 or help features 736 may enable the user to access, for example, specific web sites or locations where the user may perform additional steps.

While some embodiments described provide that instructions for installing the synchronization programs arrive from the mobile device 100, one or more embodiments provide that some or all of the instructions required to enable the install come from a web site. Still further, one or more embodiments contemplate that authorization or verification to perform an install (or initiate the install process) comes from a website.

Numerous other user interface features may alternatively be presented, based on design and implementation preferences.

System Architecture

Figure 8:
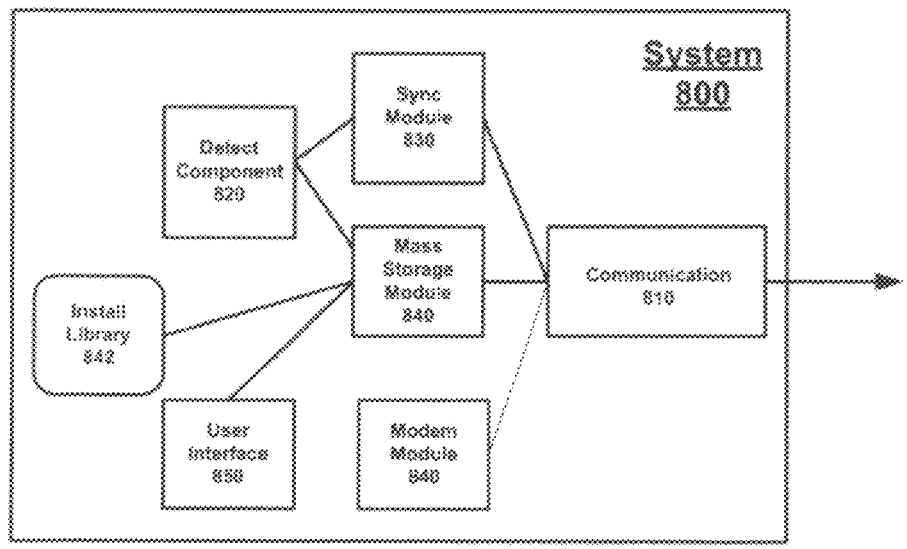
FIG. 8 illustrates software or logic components of a system that may be implemented on a mobile computing device in accordance with any of the embodiments described herein.

FIG. 8 illustrates software or logic components of a system that may be implemented on a mobile computing device in accordance with any of the embodiments described herein. In an embodiment, system 800 includes a communication component 810 which implements any of the communication modes described with previous embodiments, and which may control use of a physical port for use in establishing the connection 115 (see FIG. 1). Mode implementation logic 812 may be provided or integrated with the communication component 810.

The system 800 may include a communication/partnership or synchronization module 830 that includes a program that forms a part of a communication platform with a corresponding program on the primary computer 120. Likewise, system 800 may include a mass storage module 840 and a network modem module 860. Each of the synchronization module 830, mass storage module 840 and network modem 850 may be include or use a corresponding driver to enable the respective communication modes (see FIG. 5). The communication module 810 may include a controller (see FIG. 5) to enable mode selection, where one module is used in place of the driver. With the selection of a module, the driver for that module may be mounted onto to the communication port.

Additionally, the communication component 810 may execute and enable data communications between the mobile device and the primary computer using data or instructions provided by any of the modules. When the synchronization mode is selected, the driver of the synchronization module 830 is mounted to the communication port of the device, and one or more synchronization or data sharing applications are executed that communicate with counterpart programs on the primary computer 120 (not shown in FIG. 8) to enable synchronization of files and sharing of data amongst the two computers. In particular, one or more embodiments provide that the synchronization program 830 is executed in connection with a corresponding communication mode being implemented by the communication application 810. This mode may correspond to the first communication mode 101 (e.g.

RNDIS), made across the connection 115, as described with an embodiment of FIG. 1 or FIG. 2.

When in mass storage mode, the mass storage module 840 identifies enables the autorun applications, which include the user-interface files 850. In one embodiment, the user on the primary computer (not shown) can operate of the generated user-interface 700 (see FIG. 7) that includes any one or more features which enable the user to (i) select to have the communication/synchronization program or application installed, (ii) switch modes. As mentioned, one or more embodiments provide that the mass storage module may process return commands that include out-of-bound values to signal mode switch or other user input. The user may select from the generated user interface to have the installation performed for the communication or synchronization program. As an alternative or addition, the mass storage module may be configured to launch an installation process automatically on the primary computer. The installation process may then detect (and stop) existence of the application that is to be installed. If no such detection occurs, the installation process may perform the installation process to completion.

In one embodiment, the mass storage module 840 enables the files of the library resource 842 to be read, so as to emulate a CD-Rom device. The library resource 842 provide a selection of files on the memory of the mobile device for use in this mode of communication. The files may be hidden or located away from the normal area of user-interaction in the device memory. As an addition or alternative, the mass storage enabler 840 may enable files to be written or copied onto the primary computer. An embodiment provides that once the image of content from the library resource is generated, the mass storage module 840 executes to provide the personal computer's user access to the library resource 842 on the mobile device. In this way, the user is enabled to view the contents of a folder in the library resource 842, and to open or copy those files from the mobile device to the primary computer (or vice-versa). The files may include a set of instructions and/or data that can be installed in part or whole to provide the desired programming resource on the primary computer.

As an alternative or variation, the mass storage module 840 may be configured to identify separate instances of a mass storage space on the memory resources 114 (see FIG. 1) of the device 100. The partitions that are identified by the instances may correspond to partitions formed in the memory resource 114, and/or drive designations. In one implementation, the device 100 (FIG. 1) may be equipped with a card slot, such as for holding a MicroSD card. The mass storage module 840 may be executable to display separate instances for each partition or drive. For example, the mass storage module 840 may execute to display a separate partition for the library resources 842 and for the storage card that is maintained in the device. The user can then access and use files displayed through each partition.

Other modes of operation that may be provided from the system 800 include wireless network communication capabilities, as provided from the network modem module 840.

As detailed in an embodiment of FIG. 6, the mass storage module 840 may be operative as default under certain conditions like when the device is just out-of-the-box. But in many cases, embodiments contemplate that the synchronization mode is enabled when the mobile device is connected to the primary computer. This may occur, for example, at each instance after the first instance of the user connecting the mobile device to a personal computer. In the event that the user connects the mobile device to a new computer, for example, one or more embodiments provide that the system 800 is configured to detect the non-presence of the synchronization application or resource. In one embodiment, a detect component 820 may be linked to both the mass storage module 840 and the synchronization module 830. The detect component 820 may monitor the synchronization module 830 when the device is in the synchronization mode and just connected to the personal computer. If the connected personal computer has the corresponding synchronization or communication application, the synchronization module 830 may begin operations of its synchronization or communication applications. If the personal computer does not have the corresponding synchronization or communication application, then the synchronization module 830 may generate an error or otherwise not perform. The detect component 820 may detect this result from the synchronization module 830 and perform a programmatic mode switch to enable the mass storage module. This enables auto-installation of the desired programmatic resource to occur.

As an alternative or addition, the user interface module 850 may be launched from more than just the mass storage module 840. For example, in one embodiment, the user interface module 850 may be enabled anytime when the connection 115 (see FIG. 1) is present, in order to provide the user information (e.g. graphical indication) about the communication mode that is active.

Hardware Diagram

Figure 9:
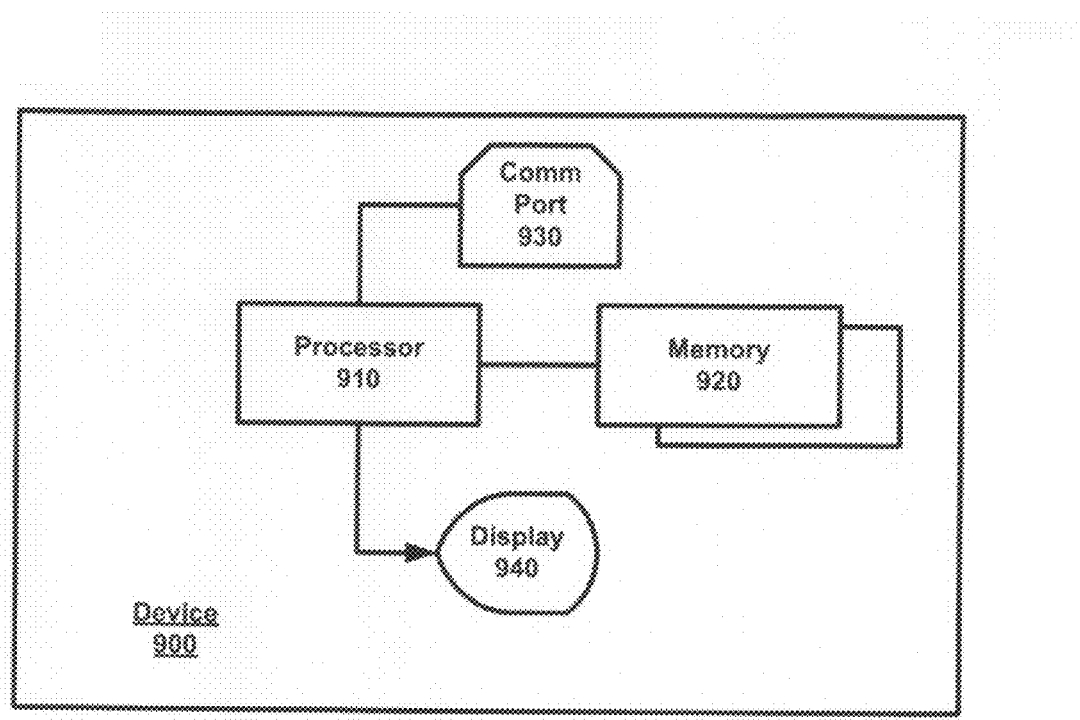
FIG. 9 illustrates software or logic components of a system that may be implemented on a mobile computing device in accordance with any of the embodiments described herein.
Figure 10:
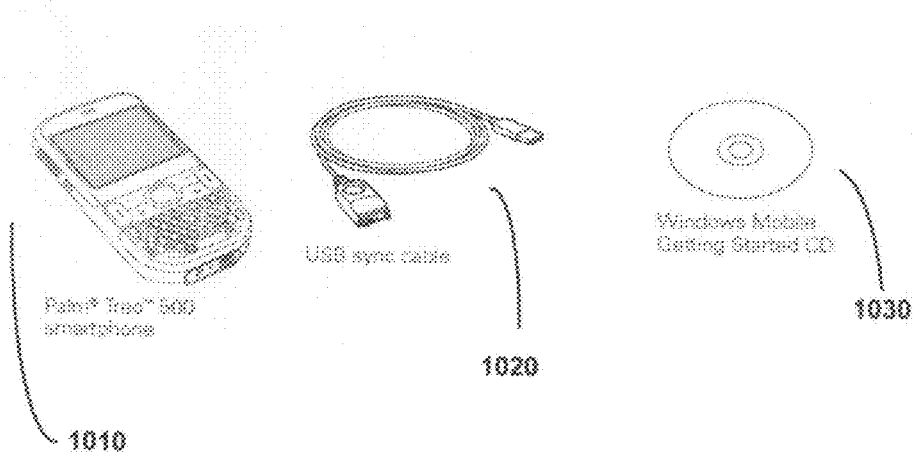
FIG. 10 illustrates typical contents of the mobile device package, as sold through retail outlets, under the prior art.

FIG. 9 provides a hardware diagram for a mobile computing device, configured to include features such as described with any other embodiment provided herein. In general, embodiments described herein may apply to numerous kinds of mobile or small form-factor computing devices. In general, such devices include the ability to synchronize or communicate with larger computers (i.e. a 'PC), for purpose of performing synchronization of files or records, exchanging data, or otherwise leveraging off the functionality and data provided from the PC.

One type of mobile computing device that may be configured to include embodiments described herein includes a mobile telephony computing device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Other examples include devices that provide audio and/or video playback or Global Positioning Services (GPS) as primary or enabled functions/Mobile computing devices in particular may have numerous types of input mechanisms and user-interface features, such as keyboards or keypads, multi-directional or navigation buttons, application or action buttons, and contact or touch-sensitive display screens. Specific types of messaging that may be performed includes messaging for email applications, Short Message Service (SMS) messages, Multimedia Message Service (MMS) messages, and proprietary voice exchange applications (such as SKYPE). Still further, other types of computing device contemplated with embodiments described herein include laptop or notebook computers, ultra-mobile computers, personal digital assistants, and other multi-functional computing devices.

The device 900 includes one or more processors 910, memory resources 920, one or more communication ports 930, a display assembly 940, and one or more mechanical input features (not shown). The processor 910 may provide the processing resource to enable any of the communication modes (or modules for enabling the communication modes, as described with an embodiment of FIG. 8), as well to enable from the mobile device the transfer of data or instructions to enable the primary computer to run the autorun applications or generate the user-interface. As an alternative or addition, one or more embodiments further provide for the display 940 of the device to generate or provide a version of the user interface, such as described with one or more other embodiments. Sill further, one variation provides that display assembly 940 is touch or contact sensitive, to enable any of the user inputs described with other embodiments to be made directly onto the mobile device.

The one or more communication ports may include wireless or wireline ports. An embodiment such as described with FIG. 1 through FIG. 8 may be executed through, for example, a wireless micro-USB port (although other standardized and non-standardized communication ports may be used). Alternatively, embodiment such as described with FIG. 1 through FIG. 8 may be implemented using wireless communication ports, including local wireless communication ports such as provided by BLUETOOTH standards, Wireless Fidelity (802.11(b) or (g)) or cellular networks. More specifically, the mobile device may include one or more wireless communication port 930 to provide wireless connectivity of a particular type (or types) for purpose of carrying out any one or more type of wireless operations. For example, the communication port 930 may correspond to a WAN radio module for sending and receiving cellular voice/data, a local wireless communication port such as Bluetooth or wireless USB, an infrared port, a Global Positioning System radio, or a WiMAX radio.

The memory resources 920 may include Flash memory, Random Access Memory, and/or persistent memory (i.e. ROM). The memory resources 920 include instructions and data for implementing functionality and programmatic actions such as provided with any of the embodiments described. Additionally, the memory resources 920 may carry databases or data stores of records that contain active data items (such as described above) for synchronization or communication, and/or enable actions on such data items of saving the data items.

In one embodiment, some or all of the functionality provided from the mobile device 900, such as the mass storage module 840 or its autorun programs, are partitioned on the device so as to be sealed or in the 'ROM' of the device. Still further, some or all of the functionality provided from the mobile device 900 may be secured from user access by security features, such as through the use of hidden files.

Alternative and Variations

With reference to an embodiment of FIG. 3, numerous alternatives or variations are described herein. As an addition or variation, while some embodiments described above provide for use of two communication modes and corresponding functionality, one more embodiments provide the use of three of more communication modes. For example, the mobile device may serve a third function for the primary computer: Internet connection sharing. In this mode of operation, the mobile device may use its wireless resources to provide wireless modem functionality for the primary computer. One more embodiments provide that the user may elect to switch to such a third communication mode while another communication mode is active. The user may enter input for making the switch using the user interface 350. For example, the user may cease synchronization (using synchronization component 330) and initiate the Internet connection sharing.

Still further, while embodiments described above provide that the detection component 320 (or other programmatic element) is capable of detecting a specific programming resource (such as a synchronization on communication program on the primary computer), one a more embodiments further provide that the detection component is configured to detect and handle a type or version of the programming resource, rather than just mere presence of the programming resource. For example if the primary computer hosts a communication or synchronization program that is of an older version, the mobile device may perform functions that include one of the following: (i) automatically update the older version of the programming resource on the primary computer, and then perform the communication or synchronization using the corresponding communication mode (thus requiring two successive communication modes, with the RNDIS connection being performed last); (ii) prompt the user with a message to install a newer version of the programming resource, through use of the memory resources of the mobile device; or (iii) ignore the older version of that programming resource as if the programming resource was not present; or (iv) scale down its corresponding communication program to be compatible with the program on the primary computer. Other variations or functions may also be performed.

The primary computer may also include an operating system or other application that has native resources for equipping itself with the appropriate program to communicate with the mobile device. In such cases, the mobile device may be configured to detect the presence of such functionality on the primary computer, and may respond by disabling or preventing execution of the alternative communication mode and mass storage enabler 340. Such a delay enables the primary computer to equip itself with programming code that the mobile device is otherwise configured to detect. The primary computer may use as its source, its own library of programming code, or it may access a web site where the desired programming resource can be installed. In either case, the installation may occur at the onset when the mobile device makes its initial connection to the primary computer.

Some embodiments described herein provide for use of out-of-bound values in structured standardized commands such as provided by SCSI. As an extension of such embodiments, one or more embodiments may use out-of-bound values in such commands from more complex or structured purposes. For example, the primary computer 120 (FIG. 1) may enable multiple modes of communications to be selected from the user-interface 700 by use of such commands or command values. In one embodiment, for example, the command values may be distinguishable so as to be interpretable by the mobile device for different tasks or operations. As another example, rather than enabling a standard install routine or process, the mobile device 100 (FIG. 1) may signal the primary computer 120 instructions for execution that enable the two devices to engage in a multi-step setup protocol. In such a protocol, the user may make choices in the installation, provide configuration data, and/or make other decisions through operation of the user-interface 700 (see FIG. 7). The inputs from the user may be translated into different out-of-bound values, structured through, for example, SCSI protocol and communicated and interpreted on the mobile device. In this way, the primary computer 'sees' and communicates with the mobile device as a CD-Rom drive, while the mobile device 100 is able to respond to certain conditions or inputs from the user that are made on the primary computer.

It is contemplated for embodiments described herein to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computing device comprising:
 a communication port;
 memory resources;
 one or more processors that combine with the memory resources to operate any one of a plurality of modules, the plurality of modules being operative in order to handle exchange of communications with a primary computer over the communication port; wherein the one or more modules include:
 a first module that is operative in a first communication mode in enabling exchange of communications with the primary computer over the communication port, wherein the exchange of communications causes the primary computer to access and execute one or more autorun files from the computing device;
 a second module that is operative in a second communication mode to be operative in enabling a first alternative function to be performed with or for the primary computer over the communication port; and
 a third module that is operative in a third communication mode to be operative in enabling a second alternative function;
 wherein the first module is configured to: (i) trigger the primary computer to automatically access and run one or more autorun files on the computing device, and (ii) provide one or more installation files as at least one of the autorun files, wherein when the first module is operating in the first communication mode, the one or more installation files are executable on the primary computer to initiate a process that determines whether the primary computer includes a designated programmatic resource; and
 wherein the second module includes a data sharing module that includes an application that executes, when the computing device is connected to the primary computer in the second communication mode, to exchange data with a corresponding application executing on the primary computer.

2. The computing device of claim 1, wherein the one or more processors enable only one of the first or second communication modes to be in place at a given instance.

3. The computing device of claim 1, wherein the first module includes a mass storage driver that enables the first module to be recognized as a CD-Rom device to the primary computer when the computing device is connected to the primary computer in the first communication mode.

4. The computing device of claim 1, wherein the one or more installation files are executable to (i) cause the primary computer to skip installation if the process determines that the primary computer includes the designated programmatic resource, or (ii) cause the primary computer to complete installation if the process determines that the primary computer does not include the designated programmatic resource.

5. The computing device of claim 4, wherein the one or more installation files are executable to cause the primary computer to complete installation by accessing a network location to download one or more files.

6. The computing device of claim 4, wherein the first module is configured to transfer instructions to the primary computer for generating a user interface as at least one of the autorun files, wherein the instructions for the user interface are executable on the primary computer to enable the user perform one or more of (i) initiate or stop installation, or (ii) enable the user to signal a switch in the communication mode.

7. The computing device of claim 6, wherein at least one of the autorun files include instructions that execute to signal the switch in the communication mode.

8. The computing device of claim 7, wherein the switch in the communication mode is signaled using an out-of-bounds command.

9. The computing device of claim 1, wherein the second module is operable to execute an application on the computing device that requires the primary computer to execute a corresponding application in order to enable the computing device and the primary computer to exchange data, and wherein the one or more installation files are executable on the primary computer to determine whether the primary computer includes the corresponding application as the designated programmatic resource.

10. The computing device of claim 1, wherein the third module enables a network modem function.

11. A method for operating a computing device, the method comprising:
 establishing one of a first communication mode or a second mode to communicate with a primary computer that is coupled to the computing device across a communication port;
 triggering the primary computer to access and autorun one or more files that are stored on the computing device when the first communication mode is established, wherein the one or more files include an installation file for a program that when operated on the primary computer, enables the computing device to establish the second communication mode to communicate with the primary computer;
 wherein triggering the primary computer to access and autorun one or more files includes:
 operating the computing device to emulate a device that triggers inherent functionality in the primary computer to seek and run one or more files on the computing device,
 causing the primary computer to initiate an installation of a data sharing program for use in sharing records on the computing device when the computing device is connected and communicating with the primary computer in the second communication mode; and
 in response to detecting that the primary computer has the program installed, switching from the first communication mode to the second communication mode by sharing one or more sets of records on the computing device with corresponding records on the primary computer.

12. The method of claim 11, wherein triggering the primary computer includes operating the computing device to emulate a CD-Rom drive or device.

13. A method for operating a computing device, the method comprising:

enabling each of a mass storage mode and a data sharing mode for communicating with a primary computer that is coupled to the computing device across a communication port;

initially connecting, or attempting to connect, to the primary computer using the data sharing mode;

determining that the computing device is unable to connect, or maintain connection to the primary computer using the data sharing mode; and switching to the mass storage mode while remaining connected to the primary computer, and triggering the primary computer to access and run one or more programs for communicating with the computing device in the data sharing mode;

wherein triggering the primary computer to access and run one or more programs includes:

operating the computing device to emulate a device that triggers inherent functionality in the primary computer to seek and run one or more programs on the computing device, causing the primary computer to initiate an installation of a data sharing program for use in sharing records on the computing device when the computing device is connected and communicating with the primary computer in the data sharing mode; and switching from the mass storage mode to the data sharing mode by sharing one or more sets of records on the computing device with corresponding records on the primary computer.

14. The method of claim 13, wherein switching to the mass storage mode includes emulating a CD-Rom drive to the primary computer, so as to trigger the primary computer to autorun one or more files.

15. A computing device comprising:
a communication port;
a processor that is configured to:
detect a connection with a primary computer over the communication port;
once the connection with the primary computer is detected, determine whether a specific programming resource is provided on the primary computer;
wherein when the processor determines that the specific programming resource is provided on the primary computer, the processor is configured to implement a first mode of communication with the primary computer;
and wherein when the processor determines that the specific programming resource is not provided on the primary computer, the processor is configured to implement a second mode of communication with the primary computer, the second mode of communication being different than the first mode of communication;
wherein when the first mode of communication with the primary computer is implemented, the processor is configured to (i) enable a manual transfer of a file for providing or installing the specific programming resource from the computing device to the primary computer, and (ii) enable at least a portion of a storage of the computing device to be used as a mass storage device on the primary computer.

16. The computing device of claim 15, wherein the processor is configured to automatically transfer a file or data set corresponding to the specific programming resource from the computing device to the primary computer when the first mode of communication with the primary computer is implemented.

17. The computing device of claim 15, wherein the specific programming resource corresponds to an application for enabling data sharing and/or transfer of data to or from the computing device.

18. The computing device of claim 15, wherein the processor is configured to establish a relationship for communicating with the primary computer when the second mode of communication is implemented.

19. The computing device of claim 15, wherein the processor is configured to automatically determine whether the specific programming resource is present on the primary computer.

* * * * *